United States Patent [19]

Homonoff et al.

[11] Patent Number: 4,686,136
[45] Date of Patent: Aug. 11, 1987

[54] LAMINATED FABRICS AND FIBER MATS AND METHOD FOR THEIR MANUFACTURE

[75] Inventors: Edward C. Homonoff, Brooklyn, Conn.; Clarke A. Rodman, East Providence, R.I.; Broaddus L. Rutledge, II, Clemson, S.C.

[73] Assignee: Allied Corporation, Morristown, N.J.

[21] Appl. No.: 799,063

[22] Filed: Nov. 18, 1985

[51] Int. Cl.⁴ .................. B29C 65/08; B32B 27/02; B32B 31/20
[52] U.S. Cl. .................. 428/286; 156/73.1; 156/290; 156/296; 156/580.1; 428/219; 428/287; 428/288; 428/296
[58] Field of Search ............ 156/73.1, 73.2, 580.1, 156/580.2, 290, 62.2, 62.8, 296; 428/74, 198, 219, 284, 286, 288, 296, 287

[56] References Cited

U.S. PATENT DOCUMENTS

| | | | |
|---|---|---|---|
| 3,844,869 | 10/1974 | Rust, Jr. .......................... | 156/580.1 |
| 3,993,532 | 11/1976 | McDonald et al. ............... | 156/580 |
| 4,025,374 | 5/1977 | Spindler et al. .................. | 156/73.1 |
| 4,157,719 | 6/1979 | De Woskin ...................... | 156/580.2 |
| 4,196,562 | 4/1980 | Hirschman ....................... | 53/450 |
| 4,259,399 | 3/1981 | Hill ................................... | 428/288 |
| 4,311,540 | 1/1982 | Hill ................................... | 156/73.1 |
| 4,404,052 | 8/1983 | Persson et al. ................... | 156/73.1 |
| 4,430,148 | 2/1984 | Schaefer .......................... | 156/580.2 |

Primary Examiner—Michael Wityshyn
Attorney, Agent, or Firm—Ken C. Decker; William N. Antonis

[57] ABSTRACT

A method of forming a laminated fabric which includes an inner air-laid, batt-like material comprising randomly arrayed fibers of carbon and a thermoplastic copolyvinyl sich as Vinyon is manufactured by feeding the outer shell layers on opposite sides of the batt through an ultrasonic treatment station where ultrasonic energy is applied to the material. The sonic horn engages one side of the laminate, while a patterned anvil roller from which pins extend radially in a predetermined pattern engages the other side of the material being treated. Accordingly, ultrasonic energy applied by the ultrasonic horn is concentrated at the pins, which fuses the thermoplastic fibers in the batt at the places where the pins engage. Since the shell fabrics are also thermoplastic, the columns formed through the batt due to their engagement by the pins and the ultrasonic energy are also fused to the outer shell fabrics. Accordingly, a laminate is produced in which columns extend through the batt to unite the outer shell fabrics with each other and with the batt.

15 Claims, 6 Drawing Figures

LAMINATED FABRICS AND FIBER MATS AND METHOD FOR THEIR MANUFACTURE

This invention was made with Government support under Contract Number DAAK60-82-C-0060, awarded by the Department of the Army. The Government has certain rights in this invention.

This invention relates to laminated fiber mats with shell fabrics and method for manufacturing such a laminated material.

Material that is capable of filtering and/or absorbing noxious gasses have many uses. Such materials often contain carbon, because carbon is widely recognized for its vapor absorption properties. Such material is particularly useful in, for example, protective garments. Accordingly, it has been proposed to provide a nonwoven batt material containing carbon fibers. U.S. Pat. No. 4,514,880 discloses a method of manufacturing such a batt containing carbon for use, for example, in a protective garment. However, it is necessary to laminate lighter weight inner and outer shell fabrics to the nonwoven web or batt containing the carbon fibers. Even in batts which do not contain carbon fibers, it is necessary to use the shell fabrics in order to protect and maintain the integrity of the batt, which can be easily pulled apart.

Accordingly, it has been proposed to provide a laminated fabric containing an inner batt and shell fabrics on opposite sides of the batt. However, attachment of the shell fabrics to the batt has proved to be extremely difficult. Shell fabrics such as nylon have been fused to the surfaces of the batt. However, laminated fabrics made in this manner can be easily pulled apart, since the heat-fusible shell fabrics are merely bonded to the surface of the batt, and it is relatively easy to pull these shell fabrics away from the remainder of the batt. It has also been proposed to fuse heat-fusible shell batt fabrics through the batt. In other words, the shell fabrics are forced into the batt until the shell fabrics come into contact with one another at spaced-apart portions of the batt, where they are heat fused together. However, this process has proved to be unsatisfactory for a number of reasons. The fact that the shell fabrics must be pierced through the batt in order to be fused together also provides a path through the batt, thereby reducing the effectiveness of the protective garment. Furthermore, such a process causes the carbon fibers of the batt to "bunch up" between the areas of the laminated fabric where the inner and outer shell fabrics are bonded together. This is undesirable for obvious reasons. The problem is enhanced because relatively heavy batts, having a weight, for example, of 4 ounces per square yard or greater, must be used in such garments.

The present invention solves problems of the prior art by providing a laminated fabric with a fusion bond common to, and integrated through, the three dissimilar components of the laminated product. The required bonding is achieved by use of an ultrasonic pin bonding mechanism, where the bond is obtained by fusion and induced by sonic energy of the thermoplastic components of the three layers, to fuse the thermoplastic media layers where they are contacted by the pins of the pin bonding mechanism. A pattern of pin bonding sights is chosen to give the laminated structure compatibility of movement to be used in garments, while retaining permeability for comfort and also retaining compatibility of the absorbent layer for the removal of unwanted or toxic materials. Although ultrasonic processes have been used in the prior art to treat textiles (see for example, U.S. Pat. No. 4,311,540), they have been used with relatively light fabrics and have not been used in fusion bonding or laminating processes in which structural components are generated in relatively heavy batts to laminate inner and outer shell fabrics thereto.

Accordingly, the present invention has the advantages of providing a laminated protective fabric in which a nonwoven batt containing carbon fibers is laminated to heat-fusible inner and outer shell fabrics by structural components which extend through the batt to integrate all three layers together. The present invention has the further advantage of preventing unwanted bunching of the fibers in the batt and of avoiding undesirable paths through the batt.

These and other advantages of the present invention will become apparent from the following specification, with reference to the accompanying drawings, in which.

Figure 1:
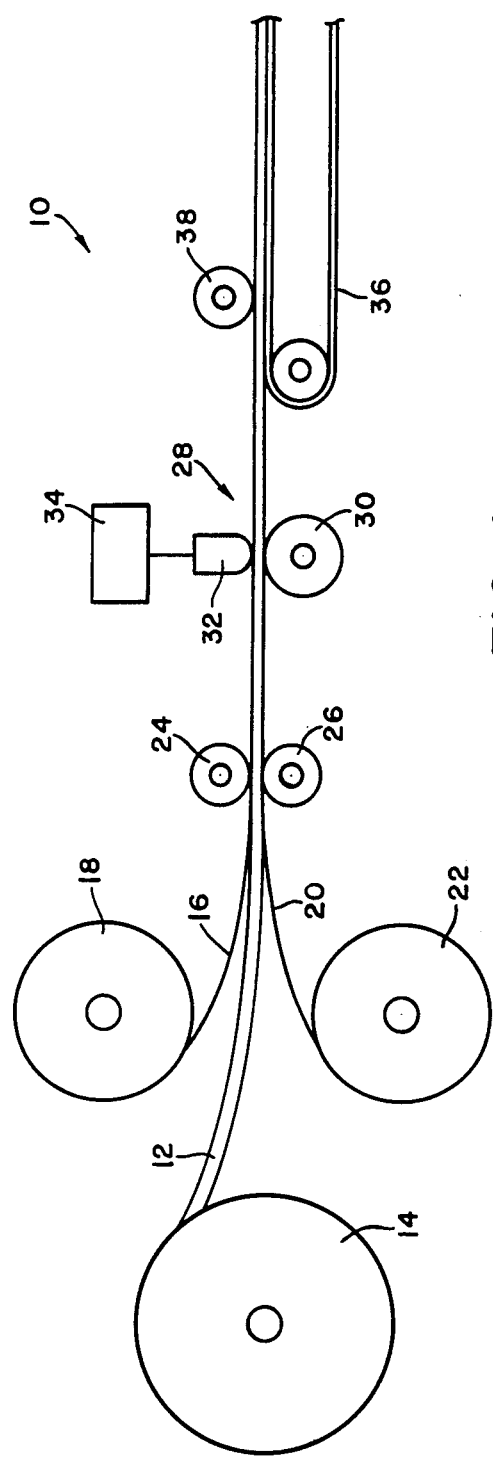
FIG. 1 is a schematic illustration of an ultrasonic apparatus used to manufacture laminates pursuant to the present invention.

Referring now to the drawing, an ultrasonic treatment machine illustrated in FIG. 1 is indicated generally by the numeral 10. A nonwoven batt 12 is fed into the machine 10 from a storage roll 14. The batt 12 is prepared in accordance with the teachings of U.S. Pat. No. 4,514,880, and comprises a mixture of 70% of an activated carbon fiber processed from a polyacrylonitrile fiber precursor or from a novoloid fiber precursor and 30% of a heat-fusible binder fiber such as vinyon copolyvinyl acetate-vinyl choride or a blend of a low melting polyester fiber with a supporting higher melt polyester fiber. In addition to the carbon fiber and the heat-fusible binder fiber, the batt 12 may also include other textile fibers. A nylon tricot knit 16 is fed from a roll 18. The nylon tricot knit is knitted, for example, of a nylon 66 yarn. Nyco work clothing twill weave 20, a woven fabric woven from a 50—50 nylon/cotton blended fiber sold under the trademark Nyco, is fed from a roll 22 and is of the type commonly used to manufacture work garments. This material is woven from textile fibers including a heat-fusible nylon thread. The laminates 12, 16 and 20 are fed through conventional feed rollers 24, 26 to an ultrasonic treatment station generally indicated by the numeral 28. The laminates are fed through the station 28 with the Nyco work clothing twill weave 20 against a patterned pinsonic roller 30 which will be described in detail hereinafter. The station 28 further includes a sonic horn 32 which cooperates with the pinsonic roller 30 to apply sonic energy to the laminates. The sonic horn 32 is operated by a conventional power supply generally indicated by the numeral 34. The completed fabric is removed from the apparatus 10 on a conventional conveyor 36 and is held thereagainst by a conventional feed roller 38. The apparatus 10 is preferably adjusted to apply sonic energy at a rate of approximately 1600 watts per square inch at an anvil pressure on the pinsonic roll 30 of approximately 20 pounds per square inch. These conditions are preferably maintained and applied at a rate of approximately 4 square yards of material per minute.

Figure 3:
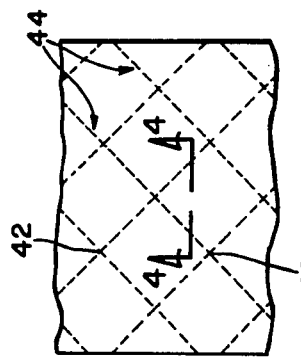
FIG. 3 is a view of the exterior of a laminated fabric made by the apparatus of FIG. 1.
Figure 2:
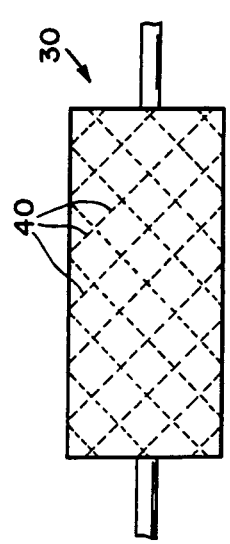
FIG. 2 is an enlarged view of the patterned anvil roller used in the apparatus of FIG. 1.

Referring now to FIG. 2, the pinsonic roller 30 includes pins 40 projecting from the circumferentially extending surface thereof. Although a number of patterns for the pins may be used, it has been found that a pin pattern of pins arranged in a diamond matrix as illustrated in FIG. 2 provides satisfactory results. As illustrated in FIG. 3, the resulting fabric treated with the apparatus 10 accordingly has the diamond matrix pattern embossed thereon, with the apexes 42 of the matrices aligned across the width of the fabric and along its length.

Figure 4:
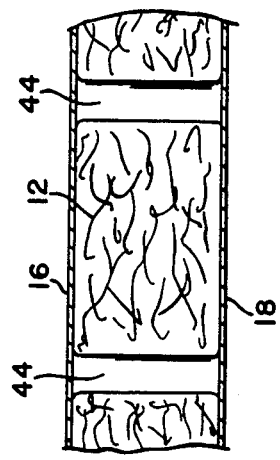
FIG. 4 is an enlarged cross-sectional view taken substantially along lines 4—4 of FIG. 3.
Figure 5:
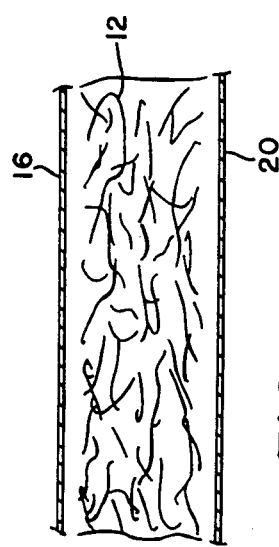
FIG. 5 is an exploded view illustrating the laminated fabrics just before treatment by the apparatus illustrated in FIG. 1.

By applying the sonic energy through the horn 32 against the pinsonic roller 30, thermal energy is applied to the laminates and is concentrated at the pins on the pinsonic roller. Accordingly, the heat-fusible components of the laminates are fused at the point where the pins 32 on the roller 30 engage the fabric. Referring to FIG. 5, which illustrates an exploded view of the laminates before sonic energy is applied, it is noted that the batt 12 is substantially uniform, as is the nylon tricot knit 16 and the Nyco work clothing twill 20. The batt 12 includes the unfused thermoplastic fibers mixed with the carbon fibers as described hereinabove. Referring now to FIGS. 3 and 4, which illustrate the laminates in FIG. 5 after they have been treated with sonic energy, it will be noted that structural columns 44 are formed to integrate the nylon tricot fabric 16 and the Nyco work clothing twill 20. Since both the nylon tricot 16 and the Nyco work clothing twill 20 include heat-fusible fibers, the structural columns 44 consist of a mixture of the carbon fibers and the thermoplastic fibers which have been fused due to the application of the sonic energy through the sonic horn 32 and the pins 40 on the anvil roll 30. Because of the pins 40 on the anvil roll 30, the sonic energy applied by the horn 32 will be concentrated at the points where the pins engage the laminates, thereby fusing the portion of the thermoplastic fibers in the batt 12 disposed between the sonic horn 32 and the pins 40 as the fabric is propelled through the station 28 by the feed rollers 24, 26, and 38 and the conveyor 36. Accordingly, the columns 44 are disposed in the diamond matrix pattern established by the pins 40, and are separated by a much greater volume of the unfused batt 12. Of course, the unfused portion of the batt 12 also includes thermoplastic fibers, but these fibers are left unfused due to the fact that the sonic energy is concentrated at points where the pins 40 engage the material. Accordingly, the vapor absorption properties of the carbon fibers and the portions of the batt 12 between the columns 44 are unaffected. Similarly, the carbon fibers will be fused with the thermoplastic fibers to form the column 44, but they do not otherwise affect the structural formation of the laminate. Since the columns 44 are spaced apart and consume a much smaller volume of the batt than the portion of the batt between the columns, the unfused portion of the batt 12 does not tend to gather or clump as was the case in prior art fabrics of this same general type. Furthermore, the rather rigid columns 44 do not form a path for transmission of vapors through the material. Because of the fusible nature of the tricot 16 and the twill 18, the columns 44 are formed integral with the outer fabric layers 16 and 18.

Figure 6:
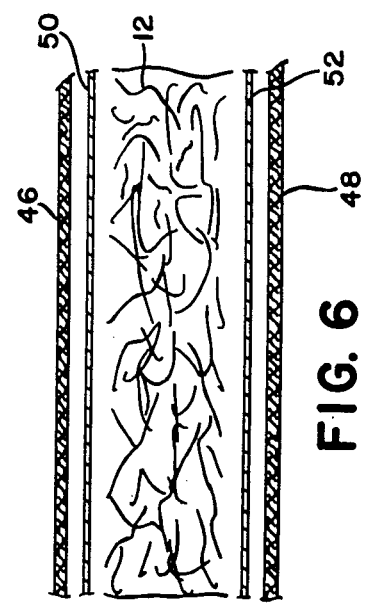
FIG. 6 is an illustration similar to FIG. 5, but illustrating another laminated fabric made by the method disclosed herein.

Referring to the embodiment of FIG. 6, garments having outer layers which do not contain thermoplastic fibers may be processed by the apparatus 10 in a manner similar to that of the laminate of FIG. 5. In FIG. 6, the outer layer 46 is Nomex pajama check, a fabric woven from an aramid fiber sold under the trademark Nomex, and the layer 48 is Nomex-Kevlar plain weave a fabric woven from aramid fibers sold under the trademark Nomex and Kevlar. Layers of polyester Sharnet textile, a polyester binder film fabric sold under the trademark Sharnet, which is a thermoplastic material, is applied on opposite sides of the batt 12 between the upper and lower surfaces of the batt (viewing FIG. 6) and the textile layers 46, 48. The layers of Sharnet textile are indicated by reference numerals 50 and 52. The material is then fed through the apparatus 10, where it is treated in the ultrasonic station 28 to form the aforementioned columns in the batt which integrate the layers of the Sharnet textile 50, 52 with the batt as heretofore described. However, since the Sharnet textile is a heat-fusible material, ultrasonic treatment of the Sharnet textile as hereinabove described will, because the Sharnet textile is extremely thin, also fuse the Sharnet to the outer layers 46 and 48.

We claim:

1. A laminated fabric material comprising an outer shell fabric layer, an inner shell fabric layer, said inner and outer shell fabric layers including a heat fusible material, and an inner layer disposed between said inner and outer shell fabric layers, said inner layer comprising a nonwoven batt containing a mixture of fibers which are thermoplastic and fibers which are not thermoplastic, said batt including spaced-apart portions in which the thermoplastic fibers are fused together to form a structural component extending through the batt, the ends of said structural components being fused with the inner and outer shell fabric layers respectively while leaving the thermoplastic fibers in said batt between said structural components unfused so that the nonthermoplastic fibers between said structural components are not altered, whereby said structural components define column means interconnecting said shell fabric layers and maintaining said shell fabrics apart to substantially prevent compression of said shell fabrics into said batt in regions adjacent to said columns.

2. Laminated fabric material as claimed in claim 1, wherein the cross-sectional area of said structural components is substantially less than the cross-sectional area of the unfused portion of the batt.

3. Laminated fabric material as claimed in claim 2, wherein said structural components are pin-shaped.

4. Laminated fabric material as claimed in claim 3, wherein said structural components are arranged in predetermined repeating patterns.

5. Laminated fabric material as claimed in claim 4, wherein said predetermined repeating pattern is a diamond matrix.

6. Laminated fabric material as claimed in claim 5, wherein the apicies of the diamond matrix patterns are aligned across the width and along the length of the fabric material.

7. Laminated fabric material as claimed in claim 4, wherein a fabric which does not contain thermoplastic material is bonded to at least one of inner and outer shell fabrics on the side of the latter opposite the side disposed against the batt.

8. Laminated fabric material as claimed in claim 1, wherein a fabric which does not contain thermoplastic material is bonded to at least one of inner and outer shell fabrics on the side of the latter opposite the side disposed against the batt.

9. Laminated fabric material as claimed in claim 1, wherein the batt has a weight greater than 4 ox./yd.$^2$.

10. Method of forming a laminated fabric material from a batt and thermoplastic shell fabric layers on opposite sides of the batt comprising the steps of preparing a nonwoven batt containing a mixture of a thermoplastic material and a material which is not thermoplastic, progressively feeding said batt in a given direction, feeding said shell fabrics in said given direction in juxtaposition to opposite sides of said batt, and heating only spaced-apart portions of said batt as it is fed in said given direction to a temperature sufficient to fuse together the thermoplastic fibers in said batt at said spaced-apart portions and to join said thermoplastic fibers at said spaced-apart portions to said shell fabrics to thereby form a structural component extending through said batt to join said shell fabrics with the spaced-apart portions of the batt, and maintain the rest of said batt other than said spaced-apart portions at a temperature less than the temperature at which said thermoplastic fibers fuse, said structural components being caused to form in sufficient quantity and size to prevent substantial compression of said shell fabrics into said batt in regions adjacent said structural components.

11. Method of forming a laminated fabric material as claimed in claim 10, wherein said spaced-apart portions are heated by applying sonic energy to said spaced-apart portions.

12. Method of forming a laminated fabric material as claimed in claim 11, wherein said sonic energy is applied by feeding said batt with said shell fabrics juxtaposed on opposite sides of said batt between an ultrasonic horn and an anvil roll.

13. Method of forming a laminated fabric material as claimed in claim 11, wherein said batt with said shell fabrics juxtaposed on opposite sides thereof is fed between an ultrasonic horn and a patterned anvil roll, the pattern on the anvil roll defining said spaced-apart portions.

14. Method of forming a laminated fabric as claimed in claim 11, wherein said batt with said shell fabrics juxtaposed on opposite sides thereof is fed between an ultrasonic horn and an anvil roll having pins arranged in a pattern thereon, said pins defining said spaced-apart portions.

15. Method of forming a laminated fabric as claimed in claim 10, including the step of bonding a fabric which does not contain thermoplastic material to at least one of said inner and outer shell fabric layers.

* * * * *